United States Patent [19]

Angel

[11] 4,273,363
[45] Jun. 16, 1981

[54] INSULATED FLEXIBLE PIPE COUPLING

[75] Inventor: Richard R. Angel, Bartlesville, Okla.

[73] Assignee: Phillips Petroleum Company, Bartlesville, Okla.

[21] Appl. No.: 52,535

[22] Filed: Jun. 27, 1979

[51] Int. Cl.³ .................... F16L 27/10; F16L 59/14
[52] U.S. Cl. .................................. 285/47; 285/49; 285/234; 285/263
[58] Field of Search ............... 285/47, 49, 234, 41, 285/54, 263

[56] References Cited

U.S. PATENT DOCUMENTS

| | | | |
|---|---|---|---|
| 1,218,895 | 3/1917 | Porter | 285/47 X |
| 1,535,209 | 4/1925 | Dubbs | 285/41 |
| 2,127,073 | 8/1938 | Topping | 285/41 |
| 2,438,312 | 3/1948 | Bunn et al. | 285/54 X |
| 3,068,026 | 12/1962 | McKamey | 285/47 |
| 3,195,504 | 7/1965 | Sampson et al. | 119/14.07 |
| 3,275,345 | 9/1966 | Waldron et al. | 285/47 |
| 3,360,001 | 12/1967 | Anderson | 137/375 |
| 3,371,946 | 3/1968 | Bleyle, Jr. et al. | 285/47 |
| 3,390,899 | 7/1968 | Herbert et al. | 285/45 |
| 3,544,135 | 12/1970 | Hoerrner | 285/47 |
| 3,680,895 | 8/1972 | Herbert et al. | 285/167 |
| 3,734,546 | 5/1973 | Herbert et al. | 285/49 |
| 3,765,705 | 10/1973 | Tantam | 285/47 |
| 3,853,337 | 12/1974 | Herbert et al. | 285/49 |
| 4,023,832 | 5/1977 | Legille et al. | 285/41 |
| 4,121,861 | 10/1978 | Gorndt | 285/263 X |

FOREIGN PATENT DOCUMENTS 675935  7/1952  United Kingdom .................... 285/47

OTHER PUBLICATIONS

Perry and Chilton, Chemical Engineer Handbook, 5th Edition, McGraw-Hill, N.Y., 1973, pp. 6-89.
Vance, Robert W., Editor, "Cryogenic Technology", John Wiley N.Y., 1963, pp. 239-241.
Scott, Russell B., "Cryogenic Engineering", D. Van Nostrand Co. Inc. Princetown, N.J., 1959, pp. 249-267.
Reinhardt, C. M., "Flexible Connectors", Paper, Twelfth Annual Pipeline Operations and Maintenance Institute, Nov. 16 and 17, 1976.

Primary Examiner—Thomas F. Callaghan

[57] ABSTRACT

A flexible pipe coupling comprises an annular housing, a nipple member partially submerged in the housing, and an annular elastomeric seal assembly between the nipple and the housing. The nipple is insulated in order to reduce the heat flow to the elastomeric seal from the material falling to the pipe coupling. The pipe coupling can also comprise a means, e.g., an annular ring, for bridging the nipple and housing to provide a constant inside diameter for the coupling. The means can also be insulated in order to aid in reducing the heat flow to the elastomeric seal.

13 Claims, 2 Drawing Figures

INSULATED FLEXIBLE PIPE COUPLING

BACKGROUND OF THE INVENTION

This invention relates to a flexible pipe coupling. In another aspect, this invention relates to a pipe coupling which is insulated. In another aspect, this invention relates to a pipe coupling comprising an annular elastomeric seal assembly between an annular housing and a nipple which is partially submerged in said housing wherein said coupling is insulated in a manner to reduce the heat flow to the elastomeric sealing assembly from the fluid flowing through the pipe coupling.

High pressure, large diameter elastomeric pipe joints have been used as deep water drilling riser flex joints. The criteria for these units are high loads, high pressure, long life, and no maintenance. A problem has resulted, however, in the use of large diameter flexible couplings in offshore production risers. The problem lies in the fact that the sea water environment in which the subsea pipeline and riser are located has a temperature of about 40° F. and the crude oil being produced through said riser and pipeline has a temperature of about 230° F. When the line is not in service, it cools to the sea water temperature of about 40° F. When it is in service, the warm crude oil temperature of about 230° F. causes a growth in the length of the pipeline forcing some lateral movement in the riser which extends from the sea floor to the top of the off-shore platform, hence, the use of a flexible coupling. The flexible couplings, however, comprise elastomeric sealing assemblies which are also subjected to temperatures of about 230° F. from the crude oil flowing through the pipe coupling. It is understood that no known elastomer can withstand a temperature of 230° F. for 20-30 years, the lifetime desired for the coupling. It would be desirable, therefore, to design a coupling which can withstand the high temperatures of the crude oil and thereby satisfy the long life and no maintenance requirements of deep water drilling riser flex joints.

Accordingly, it is an object of this invention to provide an improved flexible pipe coupling.

Another object of this invention is to provide an improved flexible pipe coupling useful in offshore production risers.

Another object of this invention is to provide a flexible pipe coupling which can survive the high temperatures of crude oil encountered in offshore production for an extended period of 20-30 years.

Other aspects, objects, and advantages of the present invention will become apparent from a study of the disclosure, the appended claims, and the drawing.

SUMMARY OF THE INVENTION

The present invention provides an insulated, flexible pipe coupling which has an annular housing with a central cavity and a nipple partially submerged in said cavity. The portion of the nipple which is submerged has a spherically flared end with an annular elastomeric seal assembly being disposed exteriorly of the flared end and extending between the nipple end and the housing end flange. Disposed interiorly of the flared end is a means for bridging the nipple and housing to provide a constant instant diameter for the coupling. The portion of the nipple which is submerged is insulated to thereby reduce the heat flow to the elastomeric seal located outside the nipple from the fluid passing through the central cavity of the pipe coupling.

In another embodiment, the means for providing a constant inside diameter for the coupling is also insulated to aid in reducing the heat transfer.

In another embodiment, the insulation is within the walls of the nipple and the means for providing a constant inside diameter for the coupling which is disposed interiorly of the nipple.

DETAILED DESCRIPTION OF THE INVENTION

Figure 1:
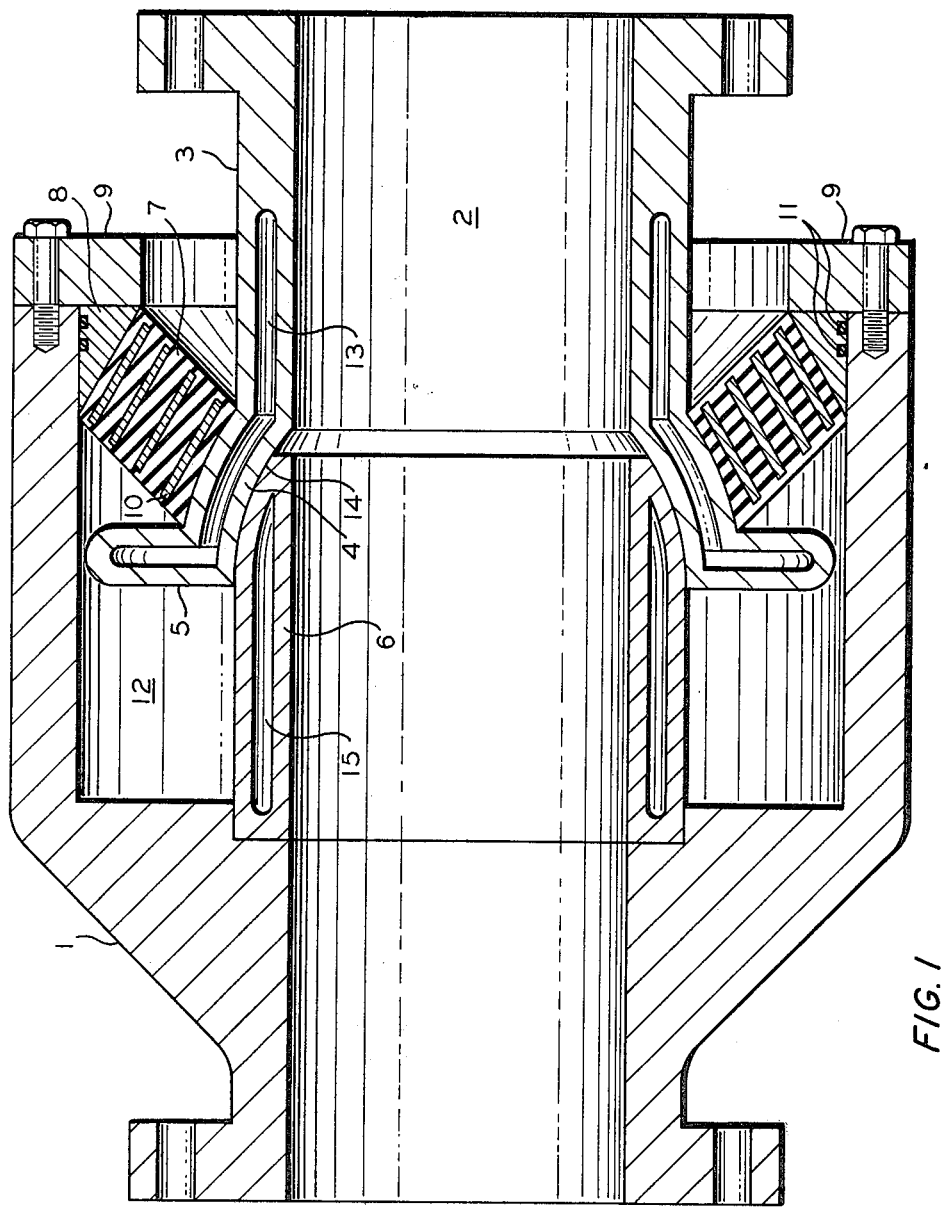
FIG. 1 shows an embodiment of this invention wherein an inner space or an evacuated chamber is used as the insulation.

The insulated flexible coupling of the present invention reduces the heat transfer to the elastomeric sealing assembly of the flexible coupling from the fluid flowing through the pipe coupling. The reduction in heat transfer extends the life of the coupling when used in an environment where hot fluids are passed through the pipe line. This type of insulated flexible coupling would be especially useful in offshore production risers where crude oil produced through the riser has a temperature of about 230° F. and the sea water environment in which the riser is located has a temperature that is much lower, e.g., about 40° F.

The flexible pipe coupling comprises an annular housing with a central cavity and a nipple that is partially submerged in the cavity. The nipple has a spherically flared end on the submerged portion. The spherically shaped flared end portion can also have a radially outwardly extending flange on its lower extremity, although the end portion need only be flared.

An annular, elastomeric seal assembly is located outside of the flared end of the nipple in the cavity between the nipple and the coupling housing. The elastomeric seal assembly extends from the flared end of the nipple to the housing end flange to thereby close the cavity. The exact configuration of the elastomeric seal assembly and the means for maintaining the assembly in place is not important and can be any which is well known in the art. For example, the elastomeric seal assembly can comprise a spherical segment with alternate spherical layers of an elastomer and a metal. The annular metal rings would provide reinforcement for the elastomer.

The flexible pipe coupling also comprises a means for bridging the nipple and the housing in order to provide a constant inside diameter for the coupling. The means is disposed interiorly of the flared end of the nipple. The particular construction of the bridging means is not critical and can be any well known in the art. For example, the means can be an annular ring which acts as a bearing. The bearing can be made out of cast metal or some other suitable material. The means can also comprise an inner and outer ring with an elastomeric pad or ring sandwiched in between. The bridging means can also be a combination of several metal rings and elastomeric rings.

The juncture of the nipple and the bridging means also need not be a sealing surface. For example, the bearing ring can be scalloped to allow the passage of fluid from the pipe to the cavity of the annular housing.

Or, some other passage can be provided to the housing cavity depending upon the particular construction of the bridging means.

The reduction in heat transfer from the fluid being passed through the pipe to the elastomeric seal assembly is provided by insulation of the submerged portion of the nipple. It is preferred that the insulation be disposed within the walls of the nipple. The insulation can then be an air space in the walls of the nipple, an evacuated chamber or a space containing insulating material such as asbestos or fiberglass. It is preferred that the insulation extend through as much of the area between the elastomeric seal assembly and the central cavity of the coupling as possible. When the nipple has a radially outward extending flange, the insulation can extend from the outwardly extending flange to a point above the upper most end portion of the coupling body and its closing flange.

The bridging means, which is disposed interiorly of the nipple and provides a constant inside diameter for the coupling, can also be insulated. When the means is an annular ring, the insulation can extend substantially the entire length of the ring and thereby reduce the heat flow from the passing fluid to the intermediate annular chamber of the housing. Insulation of the bridging means not only reduces the heat flow to the elastomeric seal assembly but also to the working fluid contained in the intermediate annular chamber which indirectly reduces the heat flow to the elastomeric seal assembly. If the coupling is used in offshore production risers, the surrounding environment will be sea water at a temperature of about 40° F. which would help cool the working fluid in the elastomeric seal assembly. The insulation would not only reduce the heat transferred to the seal assembly but also would allow the sea water to help cool the seal assembly and the working fluid in the intermediate annular chamber. As with the nipple insulation, it is preferred that the insulation be disposed within the bridging means.

The particular type of insulation employed can be any which is effective for reducing the heat flow. The insulation can take the structure of a dead air space in the nipple and/or annular bridging means, or, a chamber can be provided in the nipple and/or bridging means which can be evacuated to provide a vacuum chamber as the insulation means. Insulation material such as fiberglass or asbestos can also be disposed in the nipple, i.e., instead of a dead air space, asbestos or fiberglass can be placed in the chambers to provide the needed insulation. Any type of insulation material which would be effective in reducing the heat flow would be appropriate for the coupling of the present invention.

A better understanding of the invention will be obtained upon reference to the drawing. The drawing and its description is meant only to be illustrative and is not meant to be limiting to the invention.

Referring to FIG. 1, a pipe coupling of the present invention is shown. The Figure shows a pipe coupling comprising an annular housing (1) with a central cavity (2) with a nipple (3) partially submerged therein. The submerged portion of the nipple is a spherically flared end (4) with a radially outwardly extending flange (5) at the end of the flared portion of the nipple. The bridging means (6) is an annular bearing ring which bridges the nipple and housing to provide a constant inside diameter for the coupling.

The annular, elastomeric seal assembly depicted in the Figure comprises an annular elastomeric member (7) and a flange member (8). The elastomeric member is disposed directly against the cylindrical surfaces of the flared end (4) of the nipple (3) with the flange member (8) being disposed against the housing end flange (9). The elastomeric member is also reinforced with annular metal rings (10) thereby providing an elastomeric member having alternate spherical layers of an elastomer and a metal. O-rings (11) can also be placed in grooves in flange member (8) in order to provide for further fluid pressure sealing of the housing cavity (12).

In order to reduce heat transfer between the fluid flowing through the cavity (2) and the elastomeric seal (7), insulation (13) is provided in the submerged portion of the nipple. The insulation (13) shown in FIG. 1 is an air space or an evacuated chamber which extends from the outwardly extending flange of the nipple to a point above the upper most end portion of the coupling body and the housing end flange (9). The insulation is designed to prevent heat from flowing from the fluid in cavity (2) to the elastomer (7) through the nipple wall. The insulation not only shields the elastomer from the heat directly, but also enhances the cooling effect of the surrounding environment on the elastomer. This is particularly important when such coupling is used in offshore production risers where no maintenance and long life are requirements. The reduction of heat flow will increase the life of the elastomer seal and therefore the life of the coupling.

Generally, the coupling has a passage which allows fluid from the central cavity (2) to enter intermediate annular chamber (12) and thereby add to the working fluid. The type of passage and location thereof depends upon the particular means provided for maintaining a constant inside diameter of the coupling. In FIG. 1, an annular bearing ring (6) is employed which can be scallopped at interface (14) to allow passage of the fluid from cavity (2) to annular chamber (12). Other types of bridging means for providing a constant inside diameter for the coupling and passages from central cavities to the intermediate annular chamber of flexible couplings are well known in the art.

Additional insulation can also be provided in annular ring (6) at (15). The insulation (15) not only reduces the heat flow to the elastomeric seal but also to the working fluid in chamber (12) which is in contact with the elastomeric seal. By reducing the heat transfer to the annular chamber (12) the cooling effect of the surrounding environment again can be enhanced.

Figure 2:
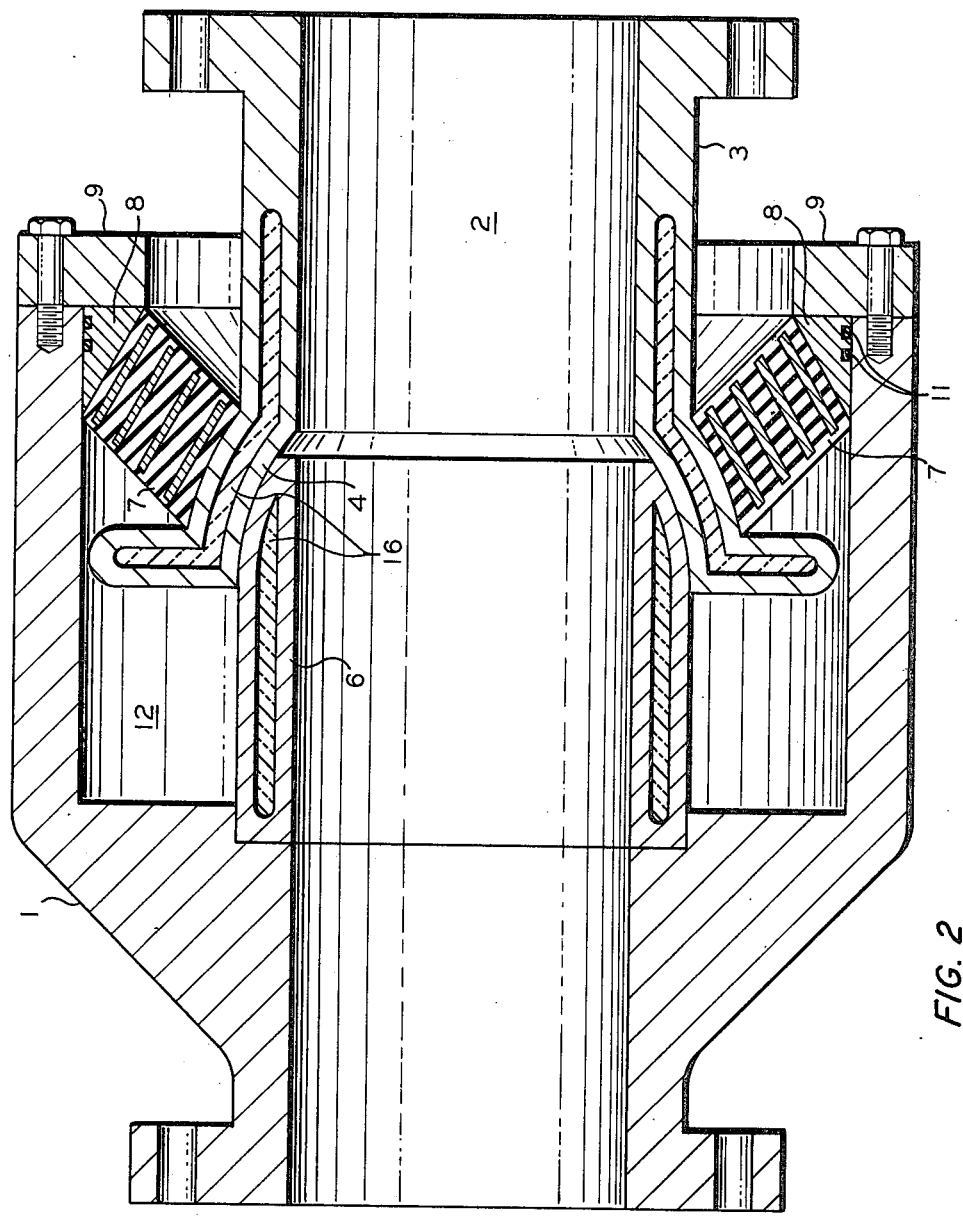
FIG. 2 shows an embodiment of this invention wherein asbestos or some other insulating material is employed.

FIG. 2 shows a flexible coupling similar to that in FIG. 1, a housing (1) having a cavity (2) with a nipple (3) having a flared end (4) partially submerged in the cavity. The flexible coupling also has the elastomeric seal (7) which closes annular chamber (12) formed by bearing ring (6) bridging the housing and the nipple. The insulation (16) employed for the nipple and for the bearing ring, however, is in insulation material such as asbestos or fiberglass or any other appropriate type of insulation material. It is preferred that the insulation is disposed within the walls of the nipple and/or bearing ring, e.g., at (16). Any other means of insulating the nipple and/or bearing ring, however, would be appropriate, e.g., having a layer of insulation outside of the walls, as long as the insulation does not interfere with the mechanics of the flexible coupling or the fluid passing through the coupling. The solid insulation acts in the same manner as an air space or an evacuated chamber in reducing the heat transfer between the passing fluid and the elastomer thereby extending the life of the elastomeric seal and the coupling in general.

Reasonable variations and modifications which will become apparent to those skilled in the art can be made in the present invention without departing from the spirit and scope thereof.

I claim:

1. A flexible pipe coupling comprising:
   an annular housing with a central cavity and a housing end flange,
   a nipple partially submerged in said cavity with the nipple 5 having a spherically flared end on the submerged portion, and a radially outwardly extending flange on the lower extremity of the submerged, flared portion of the nipple,
   an annular, elastomeric seal assembly located exteriorly of the flared end of the nipple and extending between the nipple end and the housing end flange thereby closing said cavity,
   means located internally of the flared end wherein the means bridges the nipple and housing thereby providing a constant inside diameter for said coupling,
   insulation means disposed in the nipple to thereby reduce the heat flow to the elastomeric seal located outside the nipple of the flexible coupling from fluid passing through the pipe coupling.

2. The coupling of claim 1 wherein the insulation means disposed in the nipple extends from the outwardly extending flange to a point above the upper most end of the annular housing and its closing flange.

3. The coupling of claim 1 wherein said means providing a constant inside diameter of said coupling is an insulated annular ring having insulation extending substantially the full length of the annular ring.

4. The coupling of claim 3 wherein said insulation is an air space disposed in the nipple and the annular ring.

5. The coupling of claim 3 wherein said insulation is fiberglass or asbestos disposed within the nipple and the annular ring.

6. The coupling of claim 3 wherein said insulation is an evacuated chamber formed in the nipple and the annular ring.

7. The coupling of claim 1 wherein said annular, elastomeric seal assembly is a spherical segment with alternate spherical layers of an elastomer and a metal.

8. The coupling of claim 7 wherein the elastomeric seal assembly further comprises a flange member between the housing end flange and an elastomeric layer with at least one O-ring being disposed in a groove in said flange member to provide further fluid pressure sealing.

9. The coupling of claim 1 wherein said insulation in the nipple is an air space disposed therein.

10. The coupling of claim 1 wherein said insulation is fiberglass or asbestos disposed in the nipple.

11. The coupling of claim 1 wherein said insulation is an evacuated chamber formed within the nipple.

12. The coupling of claim 1 wherein the central cavity contains crude oil.

13. A flexible pipe coupling suitable for use in transporting hot fluids via pipes in undersea environments comprising the coupling of one of claims 1, 2 or 3.

* * * * *

UNITED STATES PATENT AND TRADEMARK OFFICE
CERTIFICATE OF CORRECTION

PATENT NO. : 4,273,363

DATED : June 16, 1981

INVENTOR(S) : Richard R. Angel

It is certified that error appears in the above-identified patent and that said Letters Patent are hereby corrected as shown below:

Column 5, line 14, delete "5".

Signed and Sealed this

Fourth Day of May 1982

[SEAL]

Attest:

Attesting Officer

GERALD J. MOSSINGHOFF

Commissioner of Patents and Trademarks